United States Patent [19]

Albrecht et al.

[11] Patent Number: 4,775,311
[45] Date of Patent: Oct. 4, 1988

[54] APPARATUS FOR PRODUCING HOLLOW BODIES OF THERMOPLASTIC MATERIAL

[75] Inventors: Peter Albrecht, Hamburg; Adolf Appel, Egestorf; Günter Kleimenhagen; Wolfgang Reymann, both of Hamburg; Klaus Vogel, Barsbüttel; Walter Wiedenfeld, Hamburg, all of Fed. Rep. of Germany

[73] Assignee: Krupp Corpoplast Maschinenbau GmbH., Hamburg, Fed. Rep. of Germany

[21] Appl. No.: 117,857

[22] Filed: Nov. 5, 1987

[30] Foreign Application Priority Data

Feb. 25, 1987 [DE] Fed. Rep. of Germany ....... 3705945

[51] Int. Cl.4 ............................................ B29C 69/00
[52] U.S. Cl. .................................. 425/324.1; 198/425; 198/470.1; 198/478.1; 269/56; 414/910; 425/445; 425/DIG. 201
[58] Field of Search ................. 425/60, 161, 317, 404, 425/324.1, 445, 446, DIG. 201; 269/37, 40, 56, 57, 86; 198/406, 408, 470.1, 478.1, 425; 414/910

[56] References Cited

U.S. PATENT DOCUMENTS

| 2,510,678 | 6/1950 | Bower | 425/445 X |
|---|---|---|---|
| 2,937,428 | 5/1960 | Pocidalo | 425/161 X |
| 3,192,561 | 7/1965 | Archer et al. | 425/324.1 |
| 3,197,013 | 7/1965 | Van Der Winden | 198/408 X |
| 3,853,091 | 12/1974 | Christensen et al. | 269/57 X |
| 4,021,177 | 5/1977 | Kaiser et al. | 425/324.1 X |
| 4,388,059 | 6/1983 | Ma | 425/324.1 X |
| 4,508,025 | 4/1985 | Schultz | 198/406 X |
| 4,693,055 | 9/1987 | Olsen, Jr. et al. | 198/425 X |
| 4,697,691 | 10/1987 | Zodrow et al. | 198/425 |
| 4,735,761 | 4/1988 | Lindenberger | 425/DIG. 201 |

Primary Examiner—Richard L. Chiesa
Attorney, Agent, or Firm—Panitch Schwarze Jacobs & Nadel

[57] ABSTRACT

In an apparatus for producing hollow bodies from thermoplastic material in large numbers a plurality of stations in which the blanks are successively subjected to various treatment steps are arranged at horizontal spacings around the peripheral surface of a vertical, substantially cylindrical housing of an operating unit of the apparatus. The blanks to be treated are passed downwardly through the operating unit and a first one of the treatment stations therein to the next station therein. Arranged within the operating unit is a cam drum which rotates about a vertical axis and which has cams adapted to actuate tools for treating the blanks in at least some of the treatment stations. Two or more such operating units may be connected in succession for carrying out successive treatment operations on the blanks.

26 Claims, 7 Drawing Sheets

APPARATUS FOR PRODUCING HOLLOW BODIES OF THERMOPLASTIC MATERIAL

BACKGROUND OF THE INVENTION

One form of apparatus for producing hollow bodies from thermoplastic material involves using a mode of operation in which a hollow substantially cylindrical blank which is produced for example by molding and which has a bottom portion is subjected to a treatment consisting of a plurality of steps, in which at least a part of the blank is subjected to a variation in temperature and suitably deformed or shaped. That procedure may involve for example stretching the wall of the blank at a temperature below the vitreous transition temperature of the material forming same to provide an intermediate product or parison which is subjected to preliminary expansion at its open end; then, operating at that open and pre-expanded end, the intermediate product is expanded at least over the major part of its longitudinal extent and then subjected to a thermofixing operation, whereupon the wall portion of the expanded intermediate product, adjoining the opening thereof, is reduced in diameter and a flanged edge is formed at the free end thereof. Hollow bodies of that kind, which are of a generally can-like configuration and which can be used for example for containing beverages which are under an increased pressure within the can-like container are required in very large numbers so that there is a need for the apparatus for making same to be of such a configuration that a plurality of blanks and intermediate products formed therefrom can be simultaneously subjected to the same treatment steps. That presupposes that the apparatus has a correspondingly large number of identical treatment stations which are disposed in parallel relationship with each other.

SUMMARY OF THE INVENTION

An object of the present invention is to provide an apparatus for producing hollow bodies from thermoplastic material, which is of a compact and rationally organised structure.

Another object of the present invention is to provide an apparatus for producing hollow bodies from thermoplastic material, having a plurality of successively disposed treatment stations for carrying out treatment steps on the blank, so arranged that even with a large number of treatment stations which are disposed in parallel relationship for processing a plurality of blanks, the apparatus configuration provides that a common central drive means can provide for the performance of at least a substantial portion of the necessary functions of the plurality of treatment stations.

A further object of the present invention is to provide an apparatus for producing hollow bodies from thermoplastic material which is designed to minimise the dead or non-productive times at the respective treatment stations in which blanks are to be subjected to treatment, when the treatment steps to be respectively carried out in different treatment stations require different periods of time.

A still further object of the present invention is to provide an apparatus for producing hollow bodies from thermoplastic material having a plurality of treatment stations for subjecting a blank to successive treatment operations to produce the finished item wherein the overall rate of operation of the apparatus is not limited by the speed of operation at the slowest treatment to be performed.

Yet a further object of the present invention is to provide an apparatus for producing hollow bodies from a thermoplastic material which is of such a design layout and configuration that in the event of a fault or stoppage in a treatment station or a line of series-connected treatment stations, there is no need for the entire apparatus to be brought to a halt.

In accordance with the present invention those and other objects are attained by an apparatus for producing hollow bodies from thermoplastic material using an operating procedure in which a hollow, substantially cylindrical blank provided with a bottom portion is subjected to a treatment involving a plurality of operating steps, in which at least a portion of the blank is subjected to a variation in temperature and shape. The apparatus comprises a plurality of treatment stations arranged at horizontal spacings at the periphery of a vertical substantially cylindrical housing, and the structural unit formed from said plurality of treatment stations is provided in its upper region with an annular disc which rotates about a vertical axis, for feeding the blanks to be treated, while in its lower region the structural unit formed from the plurality of treatment stations has a second annular disc which also rotates about a vertical axis, for removing the treated blanks. The vertical spacings between the upper annular disc and the respective treatment station on the one hand and the treatment station and the lower annular disc on the other hand are bridged by substantially vertical transport means.

In an arrangement as just set forth above, at least two treatment stations in which successive treatment steps are to be performed on the blank may be combined together to form a respective treatment unit and a plurality of such treatment units may be arranged at horizontal spacings at the periphery of the housing, wherein provided in each treatment unit are conveyor elements for crossing the spacing between the treatment stations of a treatment unit.

The description of the housing as being 'substantially cylindrical' in this specification is to be interpreted to mean that the housing comprises a peripheral housing wall portion which extends therearound and which is therefore endless, forming a substantially column-like structure, with the treatment stations being arranged along the peripheral surface thereof. The peripheral surface of the housing may be provided with flat portions at which the respective treatment stations are arranged. It is also possible for the housing to be in the form of a polygon, for example in such a way that the number of surfaces each defined by a respective pair of adjacent corners thereof corresponds to the number of treatment stations or treatment units. With all such configurations, the arrangement still achieves the important advantage of the invention that a large number of parallel treatment stations or units can be disposed on a small base area, with the option that all treatment stations or treatment units of a structural unit of the apparatus have common means for feeding the blanks to that structural unit and for removing same therefrom. When the stations are arranged at the outer periphery of the housing in the above-indicated manner, they enjoy easy access thereto so that in spite of the large number of treatment stations, the apparatus is still easy to inspect and requires a small number of operating personnel. The number of treatment stations to be disposed at a structural unit of the apparatus essentially depends only on the effective diameter of the housing, with the basic configuration of the structural unit formed by a plurality of treatment stations remaining the same, irrespective of the number of stations provided.

The foregoing reference to 'substantially vertical transport paths' is intended to mean that the transport paths serve to cover or bridge across the vertical spacings referred to, in which respect, if appropriate or necessary, the transport paths may also extend in a position which deviates somewhat from a strictly vertical position, in order at the same time also to bridge across horizontal spacings. The vertical component of the transport paths should be sufficient to cause transportation movement of the blanks under the effect of their own weight so that there is no need to provide specific transportation means for actively moving the blanks across the spacings involved.

In accordance with a further feature of the invention, the treatment stations of a treatment unit may be disposed in substantially side-by-side relationship and transport elements for transporting the blanks between the treatment stations of a respective treatment unit are in the form of gripper means. The gripper means may also provide for transportation of the blanks between the substantially vertical transportation path which bridges over the spacing between the upper annular disc and the first treatment station of the treatment unit, and/or between the second treatment station of the treatment unit and the substantially vertical transportation path which bridges over the spacing between the second treatment station and the lower annular disc. It will generally not be advantageous for the vertical transportation paths to be associated with the treatment stations in such a way that the blanks coming therefrom drop directly into the first treatment station or the blanks coming from the second treatment station drop directly into the transportation path adjoining same in a downward direction. The arrangement of the treatment stations of a treatment unit in horizontal side-by-side relationship gives the advantage that the transportation paths between the treatment stations, and thus the periods of time involved in transportation of the blanks between the various operating parts of the apparatus, are short.

The means required for treatment of the blanks in the apparatus are advantageously disposed movably on the housing in substantially parallel relationship to the vertical longitudinal axis of the housing. The means for treating the blanks may be tools which for example perform shaping operations on the blanks. However, the means for treating the blanks may also be other treatment devices, for example those which are related to temperature treatment of the blanks. When a treatment station has two or more blank-treatment means therein, at least some thereof may be arranged in vertically superposed relationship.

In a particularly advantageous configuration of the apparatus according to the invention, a drum which is rotatable about a vertical axis is arranged within the stationary, substantially cylindrical housing. At its outer peripheral surface, the rotatable drum carries cam means engaged by cam follower rollers or like members which are associated with at least one of the blank-treatment means in the respective treatment station. That arrangement provides that at least some of the treatment means in all treatment stations or units which are arranged along the periphery of the housing of the apparatus are driven by a common central drive means, while the cam means are connected to the blank-treatment means by way of connecting arrangements, for example rollers, the shafts or spindles of which are passed through openings in the stationary housing.

The juxtaposed treatment stations or treatment units are preferably stationary while the central drive means, for example the above-mentioned cam-bearing drum, is moved therepast, and actuates at least some of the means required for treatment of the blanks. That design configuration makes it possible to provide an arrangement in which the individual treatment stations or treatment units are readily accessible from the exterior so that they can be easily supervised and maintained.

The height of the drum and therewith the height of the housing generally depend on the number of cam means on the drum. The number of cam means is in turn determined by the number of blank-treatment means to be actuated by the drum in each treatment unit. In that respect, it is readily possible for the spacings between the cam means on the drum and the respective treatment means to be actuated thereby to be bridged across by connecting elements such as rods, bowden cables or the like. The connecting elements for the treatment means of a treatment station may be of different lengths so that the cam means may be arranged on the drum at different distances from the treatment stations, which are normally at the same height, in all treatment units, so that the maximum number of cam means can be disposed on the drum, by virtue of the mutually displaced relationship thereof.

In many situations of use, it will be desirable for portions of the blank or the intermediate product produced therefrom to be brought in the first of the two treatment stations to a temperature that is necessary for performing the treatment operation in the second treatment station. It will be possible to carry out many treatment operations only when the blank is at a given temperature which is generally higher than ambient temperature. In that connection, in order to achieve an adequate through-put rate and also to provide that the treatment stations are arranged in such a way that they can be readily monitored and supervised, it is desirable for the temperature control operation and for example the blank-shaping operation to be separated from each other in a treatment unit in such a way that the temperature-control operation is carried out in the first treatment station while the subsequent treatment which is to be performed at a given temperature is then carried out in the second treatment station of the same treatment unit. It will be appreciated that that does not exclude the possibility that, if appropriate, a station at which the blank is subjected to a variation in its temperature may also be used at the same time for carrying out other treatment operations on the blank, and vice versa.

In a particularly advantageous configuration of the apparatus in accordance with the present invention, the first and second treatment stations of a respective treatment unit are arranged at different spacings from the longitudinal axis of the housing of the apparatus, with the result that one of those treatment stations is disposed for example directly at the housing of the apparatus whereas the other is disposed at a small spacing therefrom. In that connection it is desirable for the station which is arranged directly at the housing to be the station which involves carrying out treatments on the blank which require the higher level of forces in order in that way to minimise the transmission paths or distances between the cam-bearing drum which applies those forces, and the treatment means such as the tools for treating the blanks. That treatment station will generally be the second treatment station of the respective treatment unit as the first treatment station of each treatment unit is predominantly used to vary the temperature of the blanks, for which there is no need to apply high mechanical forces. The above-described relative arrangement of the first and second treatment stations of a treatment unit also gives the advantage that, when the housing is of a given diameter, it is possible to mount a larger number of stations and therewith treatment units in association with the housing, than would be the case if the stations of a given treatment unit were arranged in juxtaposed relationship directly at the housing, at the same radial distance from the longitudinal axis of the housing.

To provide a unitary arrangement in the apparatus, it is desirable for all treatment stations of a structural unit in which the same treatments are to be carried out on the blanks, to be arranged on a common circle, wherein the circles which are formed by the stations for performing the same treatment operations are of different diameters and are arranged coaxially with respect to the longitudinal axis of the housing.

In accordance with a further feature of the invention, the apparatus may have at least one horizontal transport path which is defined at its underside by the above-mentioned upper rotatable annular disc, and substantially horizontally extending branch paths which branch off said at least one horizontal transport path. The branch paths each have their end remote from the horizontal transport path, arranged above one of the substantially vertical transport paths which bridge across the spacing between the upper annular disc and the associated treatment station or unit. In that arrangement, the rotating annular disc preferably entrains the blanks and feeds them to the branch paths. As, having regard to the aim of achieving a high through-put rate and in regard to the large number of treatment stations and units in the apparatus, a correspondingly large number of blanks have to be transported by the rotating annular disc per unit of time, it may be desirable for the horizontal region in which the annular disc rotates to be divided into sectors of the same size, while associated with each sector is a respective feed means for feeding the blanks into the respective sector. As the horizontal transport path of a sector, in comparison with a single transport path extending along the entire annular disc, is of a shorter extent, in accordance with the number of sectors provided, and thus also has a correspondingly smaller number of branch paths branching therefrom, the annular disc may rotate at a correspondingly lower speed in order to achieve a given level of through-put, that is to say, a given number of blanks to be transported per unit of time. That is a matter of advantage because in that way the possibility of defects and faults occurring during transportation of the blanks is markedly reduced, due to the lower speed of operation of the rotating disc. That point applies in particular for the reason that, in the transport path, the blanks are in direct contact with each other so that, depending on the speed at which the disc rotates and the speed at which the blanks or intermediate products produced therefrom are moved along, a certain pressure is applied to the blanks or intermediate products, which results in undesired deformation thereof which can also cause faults and defects, whether the blanks become jammed fast in the transportation path or whether they take up an inclined position with the attendant difficulties in subsequent processing thereof. With a reduced speed of transportation movement, the likelihood of faults and defects occurring in that way is greatly reduced, even if, as is generally going to be the case, the transport path on the annular disc and possibly also the branch paths above the annular disc are delimited at the sides thereof by stationary guide elements for guiding the blanks.

If the blanks or intermediate products produced therefrom are in direct side-by-side relationship and in contact with each other on the branch paths and possibly also on the transport path, it may be necessary to provide a means for feeding the blanks to the treatment stations at intervals of time which are fixed by the operating procedure to be carried out in the respective stations. For that purpose, an embodiment of the apparatus may provide that arranged at the end of each branch path, above the associated vertical transport path, is a control member for controlling the transfer of the individual blanks from the branch path to the vertical transport path which is disposed downstream thereof, the control member being actuated in such a way that the blanks move at given intervals of time therebetween into the vertical transport path and thus into the treatment station to which that transport path leads. The rate or cycle at which the control member releases the blanks for further transportation movement thereof therefore depends on the duration of the treatment in the subsequent treatment station. The control member may advantageously be reciprocated in a substantially horizontal plane between first and second limit positions thereof. At its side which is towards the transport path, the control member may be provided with an edge recess, the cross-sectional dimensions of which are adapted to those of the blanks to be transported. In one limit position of the control element, the recess may form an extension or continuation of the branch path while in the other limit position thereof, it is disposed above the vertical transport path substantially in alignment therewith. In that respect, the arrangement is advantageously such that, if necessary, individual control members can be switched off or taken out of operation, independently of the other control members, so that for example in the event of a fault or defect in one of the treatment units of a structural unit of the apparatus, that treatment unit ceases to be supplied with blanks by virtue of the control member being switched off or taken out of operation, without the need also to stop the feed of blanks to the other treatment stations of that unit. It is even possible, if necessary, to feed blanks to only one of the treatment stations or units, in other words, the control members of all other treatment units may be taken out of operation. Such a feature may be advantageous for example when there is a requirement for tests on the apparatus to be carried out.

The speed at which the blanks are transported in the horizontal transport path which is defined by the annular disc at the underside thereof is normally not the same as the speed at which the annular disc rotates. That applies in any case in regard to the transportation movement of the blanks in the branch paths as the direction of transportation movement therein is not the same as the peripheral direction of the movement of the annular disc. In order to provide for advantageous frictional conditions, it is desirable for at least the surface of the annular disc which carries the blanks to consist of glass. That also applies in regard to the second annular disc at the lower end of the structural unit, for transporting the blanks after they have been subjected to treatment.

If the apparatus in accordance with the principles of the present invention is to be used for producing hollow bodies of thermoplastic material, using a process in which a blank is subjected to a reduction in width by being stretched at a temperature below the vitreous transition temperature, and a flanged edge is formed at the free end thereof, remote from the bottom portion of the blank, it is advantageous for the apparatus to be of such a configuration that the respective station for bringing the blank to the temperature below the vitreous transition temperature and the station for subsequently stretching the blank to reduce the width thereof form a respective treatment unit and a plurality of those treatment units are combined together to form a structural units as referred to hereinbefore.

If the apparatus according to the principles of the invention is to be used to produce hollow bodies from thermoplastic material by means of a process in which a blank is subjected to preliminary expansion at the region thereof adjoining its opening and then starting from that pre-expanded end portion is expanded to a larger diameter, the arrangement of the apparatus may be such that the station for pre-expanding the free end of the stretched blank and the station for subsequently further expanding the blank to provide the final diameter thereof and to produce thermofixing thereof form a respective treatment unit, with a plurality of said treatment units being combined together to form a structural unit as referred to hereinbefore.

If the apparatus according to the principles of the invention is to be used for producing hollow bodies of thermoplastic material by means of a procedure in which the wall portion of the blank adjoining the opening thereof is subjected to a reduction in diameter and a flanged edge is then formed at the free end of the blank, the apparatus is desirably of such a configuration that the station for reducing the end portion of the blank and the station for subsequently forming said flanged edge on the treated blank form a respective treatment unit, with a plurality of said treatment units being combined together to form a structural unit.

The arrangements as just set forth above give the advantage that each of the specified structural units combines together to form a respective treatment unit, those stations which involve carrying out treatment steps on the blanks, at short intervals of time between same. In other words, the respective stations in the treatment unit are required to perform first and second treatment steps which take place in quick succession on each respective blank. For example, in a structural unit formed by a plurality of treatment units, in the first station of a given treatment unit therein, at least portions of the respective blank are adjusted in respect of temperature while in the associated second treatment station in that temperature unit, the blank is subjected to shaping operations for which the temperature produced in the preceding temperature-control operation is necessary or at least desirable, for example to provide a sufficiently high through-put rate for the blanks. Thus, combining at least first and second stations together to provide a respective treatment unit makes it possible to carry out the necessary treatment steps on the blanks, taking account in particular of the requirements which are to be made in respect of quality of the final product. A further advantage of the apparatus configuration in accordance with the present invention is that the different treatment times in the treatment units of the individual structural units formed by combining treatment units together can be equalised in such a way that the treatment units which involve a longer treatment time therein are provided in correspondingly larger numbers. In other words, although such treatment units require a longer period of time for dealing with each blank, the fact that there is a larger number of such units means that the total number of blanks being processed in those particular treatment stations, per unit of time, is the same as the number of blanks being processed in treatment stations which involve a shorter treatment time. For example, a structural unit in which the treatment stations require a longer treatment period, may be provided with a correspondingly larger number of treatment stations or units, to compensate for the longer treatment times involved. Alternatively however it is also possible for the number of structural units for a given treatment sequence to be adapted to the treatment times involved. That means that for example more structural units are provided in respect of those treatment stations in which the treatment time is longer than in other structural units. That gives the advantage that the same basic structure may be used for all structural units, for example in regard to the number of treatment stations or treatment units, and thus also in regard to the diameter of the housing, the cam-bearing drum and so forth. Which of those two options will be preferably adopted will depend on the particular circumstances of each given individual case. At any event the invention permits a certain amount of adaptation to the respective operating factors involved in each situation, such that it is not the treatment station which involves the longest treatment time that determines the through-put rate of the whole apparatus.

A further aspect in regard to the subdivision of the structural units or the combination of the treatment stations in a respective treatment unit may also involve the blanks, on leaving the respective structural unit, being of a configuration which is advantageous in regard to the free transportation movement thereof, in particular on the rotating peripheral disc in the lower region of the respective structural unit in which the treatment operations have been carried out and possibly also on the rotating annular disc in the upper region of a subsequent structural unit, if provided, for carrying out further treatment operations on the blanks. In this connection, account should be taken of the fact that the blanks may be of a very thin wall thickness, at least in portions thereof, and in addition should be of a cross-sectional configuration which permits the blanks to be freely transported in direct contact with each other in the transport paths by means of the annular discs, without suffering from faults and defects in consequence thereof. In that context the reference to the blanks being freely transported means that they are not held during their transportation movement by any means such as grippers, but are transported by virtue of the movement of the surface on which they are carried.

Thus, in being transported between the structural units, the blanks as far as possible should be devoid of lateral projections, for example outwardly extending flanges at their free ends, as they can result in the blanks taking up an inclined postion and can thus give rise to faults and defects in the transportation phase. The spacing between the individual structural units may be bridged across by suitable transport means for the purposes of permitting successive treatment steps to be performed. In that respect, it is possible for operating stations for intermediate treatment operations, for example for the removal of excess material, to be provided between the structural units of the apparatus.

It will be appreciated that when reference is made to a 'blank' hereinbefore and subsequently herein, that means the hollow bodies which are to be subjected to processing, irrespective of their respective configuration and the state of processing or treatment thereof.

Further objects, features and advantages of the present invention will be apparent from the following description of a preferred embodiment thereof.

DESCRIPTION OF THE PREFERRED EMBODIMENT

The drawings generally illustrate an apparatus for producing hollow bodies in the form of cans, comprising treatment stations which are arranged at three structural units disposed in succession in the direction of transportation movement of the blanks through the apparatus.

Figure 1:
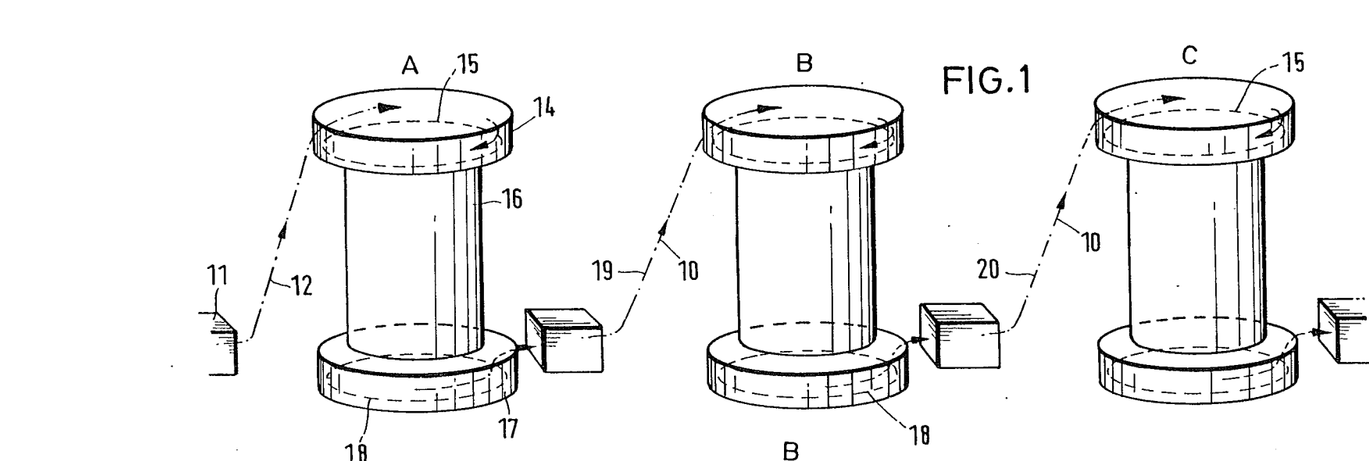
FIG. 1 is a diagrammatic perspective view of a plurality of structural units which are disposed in succession in the direction of transportation movement of the blanks to be treated.

Referring therefore firstly to FIG. 1, illustrated therein are three structural units A through C which are arranged in succession in the direction of transportation movement as indicated at 10 of the blanks to be treated in the apparatus. Reference numeral 11 in FIG. 1 indicates a suitable piece of equipment which for example has a stock of blanks and from which the blanks are successively supplied by way of a suitable conveyor device 12 to the upper region 14 of the first unit A in the direction of transportation movement 10. The upper region 14 of the unit A has a first annular disc 15 (see also FIGS. 3, 7 and 8) which is arranged in a horizontal plane and which is rotatable about a substantially vertical axis.

The blanks coming from the device 11 are put on to the rotating disc 15 by the conveyor apparatus 12, in a manner which will be described in greater detail hereinafter.

Arranged beneath the upper region 14 of the unit A and coaxially with respect to the axis of rotation of the disc 15 is a housing 16 which is substantially cylindrical or polygonal in cross-section, as referred to hereinbefore. The housing is surrounded at its lower end by a substantially circular base 17 in which a second annular disc 18 is arranged in coaxial relationship with respect to the upper disc 15 and the stationary housing 16.

All the units A, B and C shown in FIG. 1 are of the same basic structure as just described above. The units A and B, and the units B and C, are interconnected by suitable conveyor devices as indicated at 19 and 20 respectively. It will be seen that the blanks leaving a structural unit at the lower part thereof, above the respectively associated annular disc 18, are passed to the subsequent unit in the upper region thereof and put on to the upper annular disc 15 of that unit.

The treatment stations for treating the blanks in the individual structural units A through C are arranged around the stationary housing 16 on the outside thereof at at least substantially identical horizontal spacings from each other. The number of treatment stations which are arranged in that manner about the periphery of the housing of the respective unit depends on the amount of space to be occupied thereby, and the diameter of the housing 16.

Figure 5:
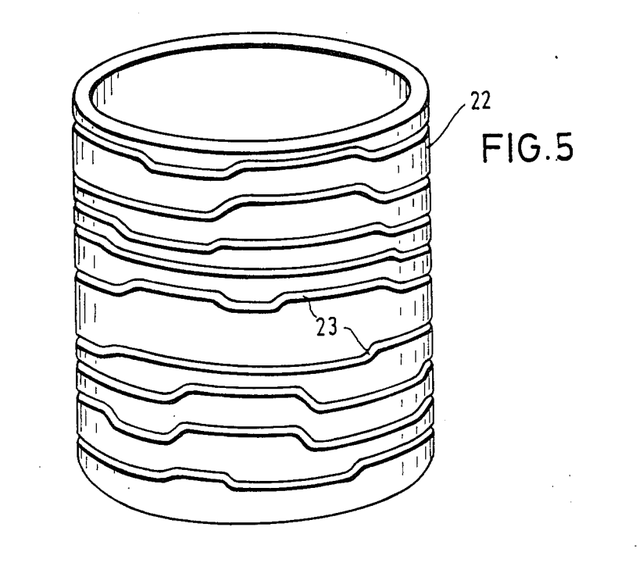
FIG. 5 is a diagrammatic perspective view of a cam-bearing drum arranged within the stationary housing in FIG. 4.
Figure 6:
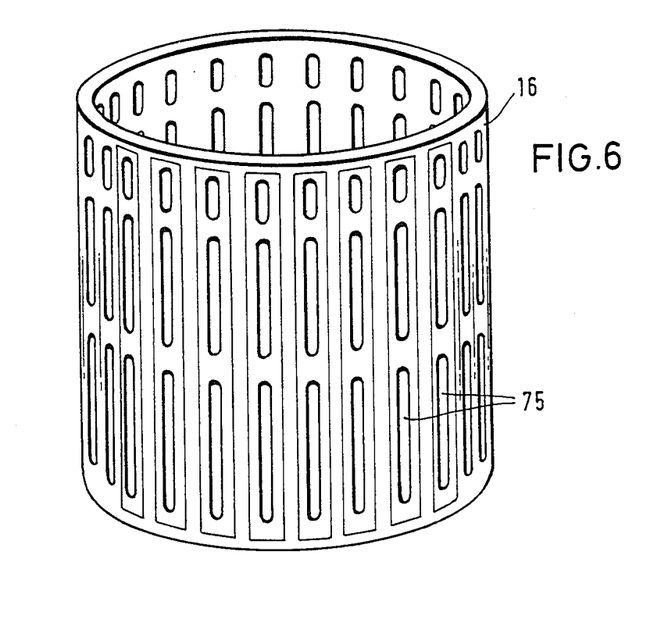
FIG. 6 is a diagrammatic perspective view of a housing without additional components of the apparatus.
Figure 11:
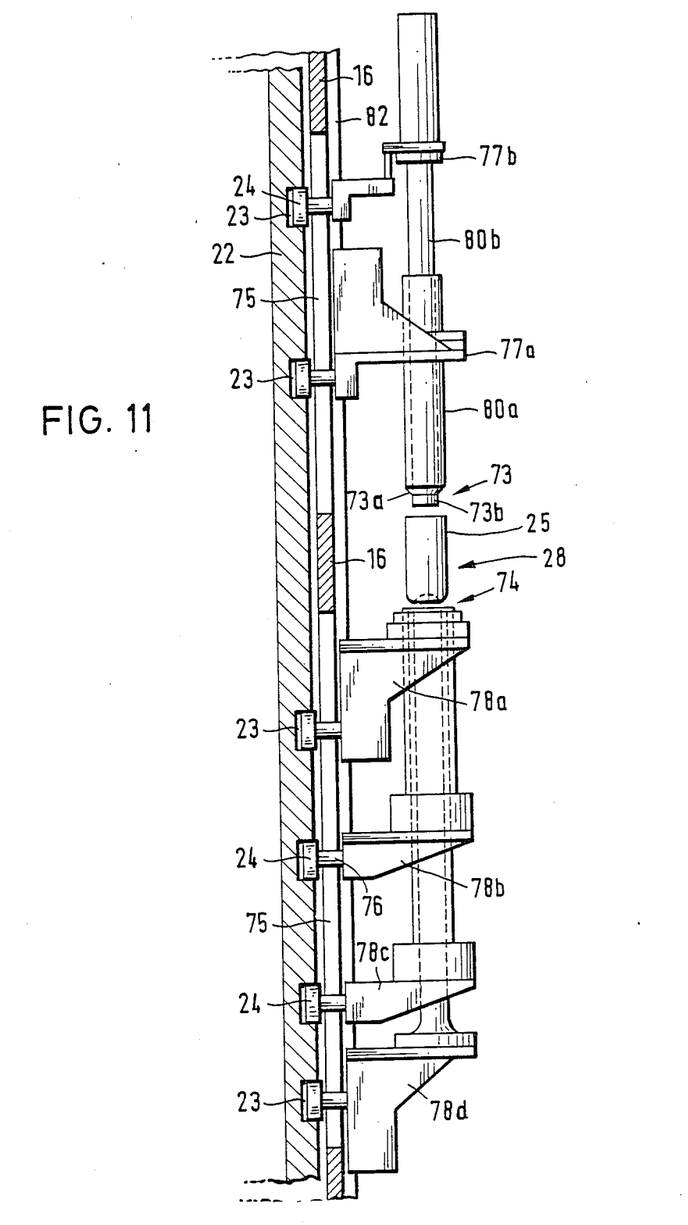
FIG. 11 is a portion of a view in longitudinal section through part of the apparatus comprising the housing, and the cam-bearing drum with blank-treatment tools of a treatment station.

At least some of the tools or other means for carrying out the treatment operations on the blanks in the individual treatment stations are actuated by a cam drum 22 (see FIG. 5) which rotates within the housing 16 in coaxial relationship therewith about a vertical axis which coincides with the axes of rotation of the upper annular disc 15 and the lower annular disc 18. The drum 22 is provided on its outside with cams 23 which extend peripherally thereof and which co-operate with cam follower rollers 24, as shown in FIG. 11. The cam follower rollers 24 are connected to the blank-treatment tools in a manner to be described hereinafter.

Those treatment stations through which each blank passes for the purposes of being subjected to the treatment steps to be effected thereon in the respective structural unit are combined together to form a respective treatment unit. All treatment units of one of the structural units A through C are of the same design configuration so that the same blanks are treated in the same manner in all the treatment units of a structural unit A through C. Accordingly, for a given treatment time per blank in a treatment unit, the through-put capacity of each structural unit A through C depends on the number of treatment units which are disposed at a structural unit.

Figure 2:
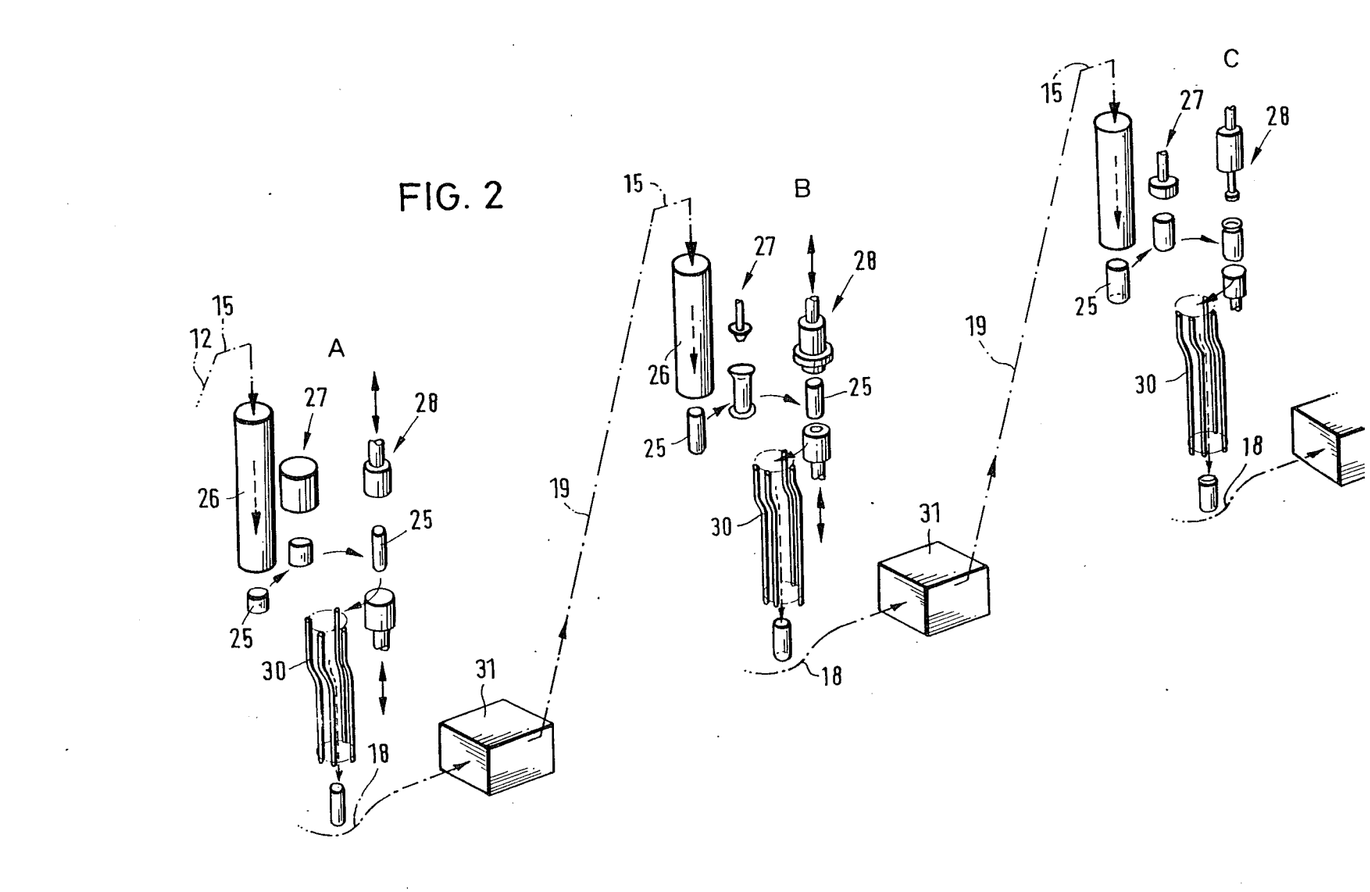
FIG. 2 is a diagrammatic view of the transportation movement of a blank through three successive structural units as shown in FIG. 1.

Referring now to FIG. 2, it will be seen therefrom that each blank passes through all units A through C, in a manner which is in principle the same. A respective blank firstly goes from the upper disc 15 in a manner to be described hereinafter into a substantially vertically extending shaft 26 which is of an inside diameter that is adapted to the outside diameter of the blank 25. The shaft 26 through which the blank 25 drops terminates at a position corresponding to about the mid-height location of the housing 16, laterally beside the first treatment station 27 of the treatment unit associated with the respective shaft 26. The blank 25 is pushed out of the shaft 26 by transport means which are to be described in greater detail hereinafter, into the first treatment station 27 in which it is subjected to a first treatment, for example being set to a given temperature in the structural unit A. At the end of the treatment in the first treatment station 27, the blank 25 is then moved into an adjoining second treatment station 28, in which it is subjected for example to a shaping or deformation operation, for example being a drawing operation in structural unit A, as a result of which the wall of the blank is subjected to a stretching effect, thus increasing the length of the blank. When processed in that way, after termination of the treatment in the second station 28, the blank 25 is in turn transported by means of a substantially horizontal transportation movement into a position above the upper opening of a second conveyor shaft 30 and then released so that it falls down through the shaft 30 into the region of the lower disc 18. The lower conveyor shaft 30 does not extend precisely vertically but is somewhat curved in order to move the blank 25 into the region of the lower disc 18 or close thereto, the disc 18 being of somewhat larger diameter than the disc 15, for reasons of enhanced accessibility thereto. The lower conveyor shaft 30 comprises a plurality of rods or wires which are arranged in a cage-like configuration, as can be clearly seen from FIG. 2, or alternatively it may comprise a tube. The shaft 26 may also be of a cage-like configuration formed by rods or wires.

From the respective lower disc 18 in each unit A or B, the blank 25 is moved by suitable conveyor devices 19 into the respectively subsequent structural unit B or C in which the intermediate product produced from the blank in the preceding station is subjected to further treatment operations. Devices 31 may be disposed between the units A through C, in which additional processing operations, for example cutting operations, may be carried out on the blanks or on the intermediate products made therefrom. The devices 31 may also serve to form a stock of blanks or intermediate products from which same can then be passed to the respective following structural unit.

Figure 7:
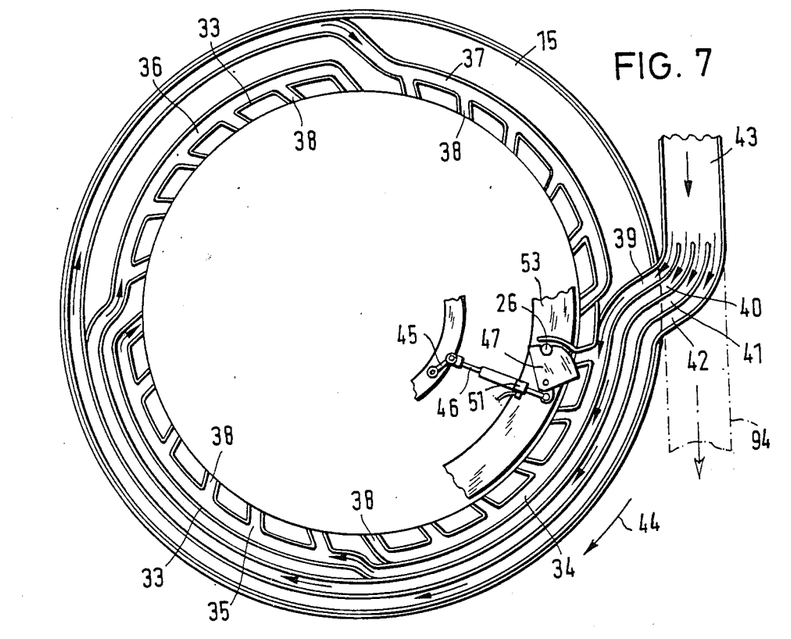
FIG. 7 is a plan view of FIG. 3 looking in the direction indicated by the arrow VII.
Figure 8:
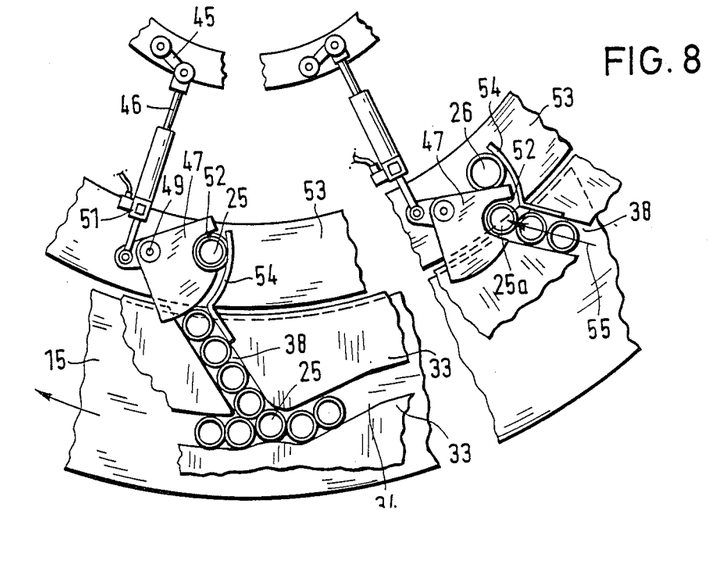
FIG. 8 is a detail from FIG. 7 on an enlarged scale.

Reference will be made at this point to FIGS. 7 and 8 showing that associated with the upper disc 15 and arranged thereabove are stationary guide means 33 for the blanks 25. The guide means may be for example sheet metal members, wires or the like and are so arranged that they are at a spacing from each other slightly larger than the largest outside diameter of the blanks 25 and thus, with the top face of the disc 15, form respective transport paths along which the blanks 25 are advanced. There are four transport paths 34, 35, 36 and 37, which are coaxial with respect to the axis of rotation of the disc 15, for guiding the blanks 25; each of the transport paths 34–37 is associated with a respective quarter of the circle which is covered by the annular disc 15 as it rotates.

From each of the transport paths 34–37 which thus circumscribe a respective quarter circle, branch paths 38 branch off inwardly and, as can be seen in particular from FIG. 8, terminate at their ends remote from the respectively associated transport path 34–37 above one of the vertical conveyor shafts 26 which makes the communication between the feed arrangement in the upper region of the respective structural unit A–C, more particularly therefore the disc 15, and the respective treatment unit associated with that shaft. In the construction shown in FIG. 7, each quarter-circle is provided with six branch paths 38 so that, as each treatment unit has a branch path associated therewith, the illustrated structural unit has 24 treatment units.

Disposed upstream, relative to the path of movement of the blanks 25, of each quarter-circle transport path 34–37 is a particular feed path for the blanks 25 to be subjected to treatment, so that in all there are four feed paths 39, 40, 41, and 42. In the construction illustrated in particular in FIG. 7, all feed paths 39 through 42 are fed from a common main feed path 43 from which the individual feed paths 39 through 42 extend in the manner shown in FIG. 7. That arrangement provides that the feed paths 39 through 42 are of different lengths because, over a part of their lengthwise extent, they are parallel to each other and thus coaxial with respect to each other and the axis of rotation of the disc 15. Accordingly, the feed path 42 for feeding the transport path 37 which is at the most downstream position in regard to the direction of transportation movement 44 of the blanks 25 on to the disc 15 is of the greatest length, extending around about three-fourths of the overall circle configuration. The feed paths 41, 40 and 39 for the other transport paths 36, 35 and 34 are of correspondingly reduced lengths. However, those variations in length are immaterial in regard to feeding the blanks to the individual transport paths 34–37 as, assuming that in each case sufficient blanks are supplied by way of the main feed path 43, the blanks are automatically distributed to the individual feed paths 39–42, the speed of rotation of the disc 15 in the direction indicated by the arrow 44 being higher than the speed at which the blanks are advanced in the individual feed paths 39–42 and the individual transport paths 34–37. The main feed path 43 is disposed downstream of the respective conveyor devices 12, 19 and 20 associated with each structural unit A–C, which transport the blanks to the level of the respective adjacent disc 15.

It will be appreciated that the arrangement may also be such that the main feed path 43 is omitted and associated with each transport path 34–37 is a feed path which is also separated in space from the other feed paths. That may involve for example the individual feed paths being connected, in substantially radially extending configuration, to the leading portion of the individual transport paths. However that would involve an additional apparatus expenditure. The construction shown in FIG. 7 permits transportation of the blanks also to be effected in the region of the feed paths 39 through 42 by means of the disc 15 which for that purpose is only required to be of somewhat larger radial dimension. In FIG. 7, the transport paths 34 through 37 are shown in the form of arcuate portions, for the sake of simplicity. In actual fact, as shown in FIG. 8, the transport paths 34 through 37 are of a configuration which differs somewhat from a circular arc, to make it easier for the blanks to pass into the branch paths 38.

It has already been mentioned hereinbefore that the blanks are fed to one of the respective shafts 26 through each of the individual branch paths 38. As treatment of the blanks in the individual treatment stations 27 and 28 takes a certain amount of time, the blanks must accordingly be passed through the shafts at given intervals of time which are adapted to the treatment time involved in treating the blanks in the treatment stations or the treatment units formed by a plurality of treatment stations. As the disc 15 rotates at a higher speed than the speed at which the blanks are moved in the feed paths 39 and 42, the transport paths 34–37 and the branch paths 38, an accumulation of blanks is formed in the feed paths, the transport paths and the branch paths. In other words, the blanks are pressed against each other by virtue of the continuous rotation of the disc 15 and are therefore constantly subjected to a force tending to push the blanks along the transport paths and therefrom into the branch paths 38. In order to prevent the blanks from uncontrolledly issuing from the branch paths 38, each branch path 38 is provided at its end remote from the respectively associated transport path 34-37 with a control member which is pivotable with a reciprocating movement between first and second limit positions. In FIG. 8, one limit position is shown at the left and the other limit position is shown at the right. In the embodiment illustrated in the drawings, each control member 47 comprises at least one substantially triangular flat element which is pivotable between its first and second limit positions about a vertical axis 49. For that purpose, each control member 47 is connected by way of suitable connecting elements 45 and 46 to a cam on the cam drum 22. Incorporated into the arrangement for transmitting that movement is a coupling member 51 which makes it possible to stop the control member 47. At its side remote from the respectively associated branch path 38, the control member 47 is provided with an edge recess 52, the cross-sectional dimensions of which are adapted to those of the blank 25. Disposed in alignment with each branch path 38 which is still in the region of the annular disc 15 and at the level of the annular disc 15 is a stationary bottom or floor member 53 in the form of a ring which bridges the gap between the inner boundary of the annular disc 15 and the vertical conveyor shaft 26 which is disposed downstream of the respective branch path 38 and the upper opening of which is disposed in the plane of the ring member 53. Associated with each guide member 47 is a lateral guide 54 which is mounted on the guides delimiting the respective transport path or branch path and which also bridges over the spacing between the disc 15 and the vertical conveyor shaft 26.

In the limit position of the control member 47 which is shown at the right in FIG. 8, the edge recess 52 thereof is in a position in which it forms an extension of the associated branch path 38 so that, coming from the branch path 38, the blank 25a which is the leading blank in the direction of conveying movement as indicated by 55 in FIG. 8, is pushed into the recess 52 under the action of the force applied to the blanks by the rotating disc 15, and then takes up the position shown at the right in FIG. 8 in which at least a substantial part of the bottom surface of the blank is already outside the region of movement of the disc 15. Thereafter, at a given time which depends on the period of time required for treatment of the blanks in the treatment stations, the control member 47 is displaced by means of a cam on the drum 22, which cam is associated with all control members 47 of a structural unit A-C, into the second limit position which is shown at the left in FIG. 8 and in which the recess 52 and therewith the blank 25a entrained by the control member 47 is above the shaft 26 and thus falls into the shaft 26 at the end of the pivotal movement of the control member. The guide 54 is of such a shape that during the pivotal movement of the control member 47, it holds the blank 25a in its position within the recess 52 so that at any event, at the end of the pivotal movement of the control member, the blank 25a is guaranteed to be in the correct position relative to the opening of the shaft 26.

Depending on the axial extent of the blanks, that is to say, the height thereof when standing vertically, the control member 47 may comprise two or more sheet members or the like which are arranged at a spacing one above the other and which are fixedly connected together in order in that way to provide that the blank is satisfactorily guided and entrained thereby.

Figure 9:
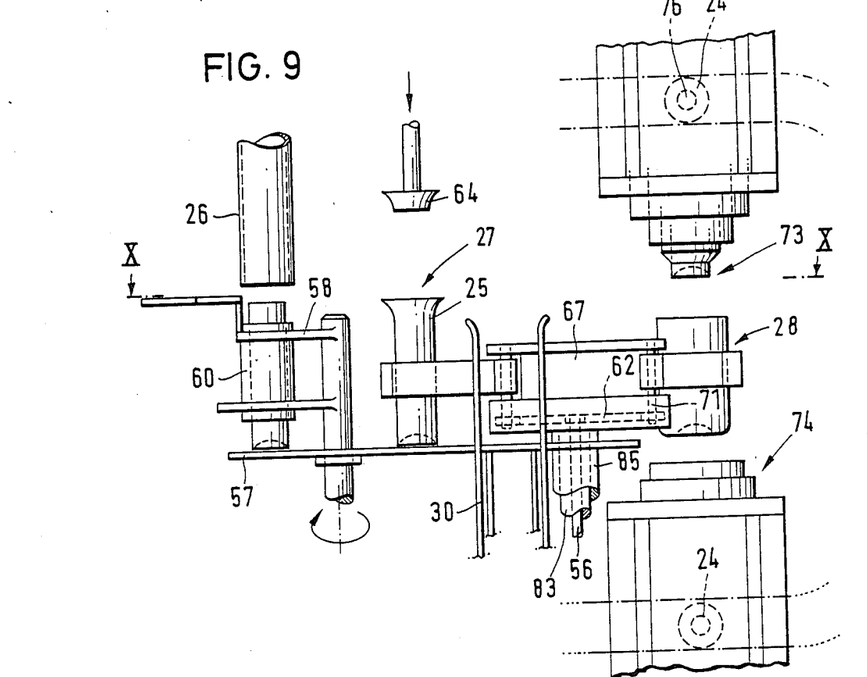
FIG. 9 is a diagrammatic view of a treatment unit viewing in the direction indicated by the arrow IX in FIG. 3.
Figure 10:
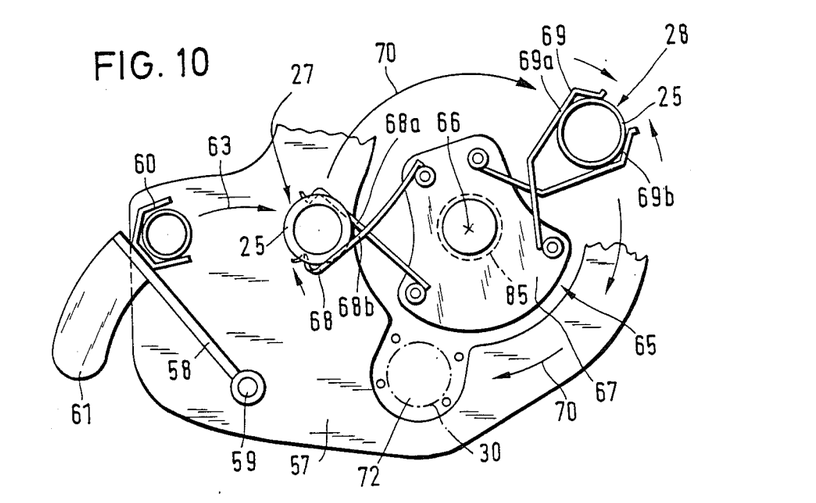
FIG. 10 is a view in the direction indicated by the arrows X—X in FIG. 9, of the transportation means associated with the treatment unit.

Referring to FIGS. 9 and 10, shown therein are details of the transportation movement of the blanks within each treatment unit. In describing FIG. 2, it was assumed that in the structural unit in question, after the temperature-adjusting operation which is carried out on a blank in the first station 27, the blank is subjected to a stretching effect in the second station 28 of the treatment unit. The blank 25 when treated in that fashion, after leaving the structural unit A, is passed to the structural unit B for further treatment steps to be carried out. FIGS. 9 and 10 are a diagrammatic view of a treatment unit of the structural unit B with associated transport means. As the units B and C are of the same configuration as the unit A, they also have in their upper region a rotatable disc 15 for feeding the blanks by way of branch paths 38 and substantially vertical transport shafts 26 to the individual treatment units. There are also the lower conveyor shafts 30 and the second disc 18 arranged in the lower region of the structural unit, for removing the blanks after they have been subjected to treatment in the structural unit B.

The differences between the individual structural units A-C are therefore essentially concerned with the configuration of the treatment stations, in particular the means and tools for treating the blanks, as well as the dimensions of the transport means, for the purposes of adaptation to the dimensions of the blanks in the individual structural units, in which respect the blanks undergo changes in their dimensions within such a unit. The treatment means are of a configuration which depends on the respective treatment operations to be carried out on the blanks or intermediate products.

Figure 4:
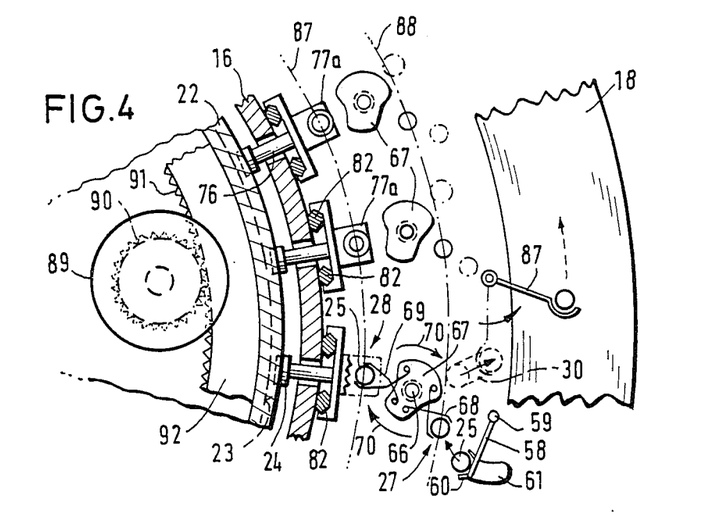
FIG. 4 is a view in the direction of the arrow IV—IV in FIG. 3.

Reference will now be made to FIG. 9 showing that the upper conveyor shaft 26 of each treatment unit opens beside the first treatment station 27, more particularly at the side thereof which is remote from the second treatment station 28. A bottom plate 57 is arranged beneath the free end of the conveyor shaft 26 at a spacing therefrom which is somewhat larger than corresponds to the respective maximum longitudinal dimension of the blank 25. A transport arm 58 is arranged for reciprocating pivotal movement about a vertical axis 59, between the region beneath the shaft 26 and the first treatment station 27. Mounted on the arm 58 adjacent the free end thereof is a carrier 60 which is open at one side and which in other respects is adapted to the respective cross-sectional shape of the blank. In addition the arm 58 is provided with a projection 61 which extends substantially in a horizontal plane and which is disposed at a small vertical spacing from the lower end of the shaft 26. The configuration of the projection 61 is clearly apparent from FIG. 10. The arm 58 can be pivoted between first and second limit positions, FIGS. 4, 9 and 10 showing that limit position in which the carrier 60 for the blank 25 is disposed beneath the shaft 26 in alignment therewith so that a blank 25 moving downwardly out of the shaft 26 is positively and necessarily disposed in the carrier 60, when it meets the bottom plate 57. The arm 58 is pivoted into the other limit position thereof, by pivotal movement in the direction indicated by the arrow 63. That limit position corresponds to the axial position of the blank in the first treatment station 27. In the course of the pivotal movement in the direction indicated by the arrow 63 the projection 61 is pivoted into a position in which its end region remote from the carrier 60 is just below the lower end of the shaft 26 so that with the carrier 60 of the arm 58 in the first treatment station 27, a blank which drops downwardly through the shaft 26 first meets the projection 61 which is of a slightly curved configuration, corresponding to the pivotal movement performed by the arm 58 and the radius of that arm. In the course of the return movement of the arm 58 into its left-hand limit position as shown in FIGS., 4, 9 and 10, in the last phase of that movement, the projection 61 is moved away out of the region beneath the shaft 26 so that the blank which is carried by the projection 61 and which cannot take part in the movement thereof as the major part of the longitudinal extent thereof is still disposed in the shaft 26 falls downwardly on to the bottom plate 57 and into the carrier 60 and, in the next pivotal movement of the arm 58 in the direction indicated by the arrow 63, is pushed into the first treatment station.

Associated with the first treatment station 27 is a tool 64 which can be moved up and down as indicated by the associated arrow in FIG. 9; the tool 64 is of a downwardly taper configuration as can be clearly seen by FIG. 9, and can be heated. The tool 64 is lowered into the upwardly facing opening of the blank 25 which is in the first treatment station 27 so that the upper region of the blank 25 is firstly heated by the tool 64 and is then expanded in the illustrated cup-like configuration under the effect of the pressure exerted by the tool 64.

Figure 3:
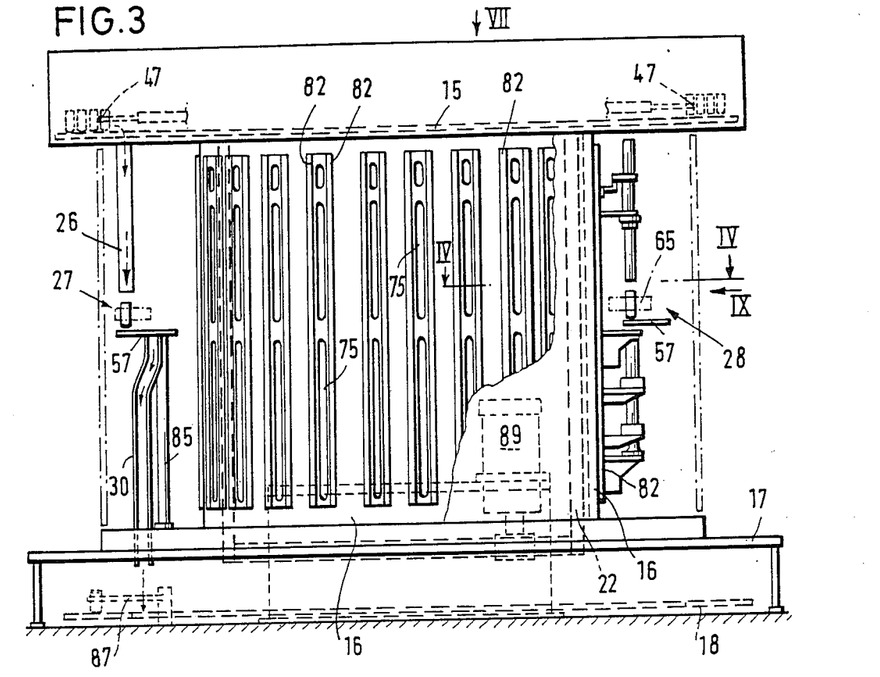
FIG. 3 is a diagrammatic side view of a structural unit, only some of the treatment stations being illustrated for the sake of clarity of the drawing.

The treatment unit comprising the first and second treatment stations 27 and 28 has associated therewith a further transport element 65 comprising a blcok 67 which is pivotable about a vertical axis 66 as indicated in FIG. 10, and which carries first and second grippers 68 and 69, the two parts of each of which as indicated at 68a, 68b and 69a, 69b respectively are also mounted on the block 67 pivotably in a horizontal plane for performing closing and opening movements. The drive for the opening and closing movements is transmitted to the gripper members 68a, 68b and 69a, 69b by way of connecting elements 56, 62 and 71. The drive for the rotary movement of the member 67 is produced by way of a tube portion 83 as shown in FIG. 9, which is in coaxial relationship with the connecting element 56 and which is fixedly connected to the member 67. The two connecting members 56 and 83 are suitably connected to respective cams of the cam-bearing drum 22, by means of which the respective movements of the above-mentioned components are produced. In a modification of the structure illustrated in FIGS. 9 and 10, it is also possible for the drum 22 or a projection portion thereof to carry cams which are open in a horizontal plane, that is to say upwardly or downwardly. Such cams may be mounted for example on a flange-like projection at one end of the drum 22. In certain situations, for example in connection with the drive by way of the connecting elements 56 and 83, cams extending in a horizontal plane have the advantage that there is less need for a change in the direction of the flow of force than when the force required for actuation of the apparatus is taken from a cam 23 mounted at the periphery of the drum 22. The two connecting members 56 and 83 are enclosed by a stationary tube portion 85 which is coaxial therewith and which, as can also be seen from FIG. 3, is supported on the base 17 of the structural unit A, B or C. The tube portion 85 carries the bottom plate 57 and possibly further components in the respective first treatment station. In the position of the components shown in FIGS. 4, 9 and 10, the gripper 68 is in the first treatment station 27 and the gripper 69 is in the second treatment station 28.

After the blank 25 has been treated in the first treatment station 27, the member 65 is pivoted about the vertical axis 66 in the direction indicated by the arrow 70 in FIG. 10, with the blank 25 gripped by the gripper 68 being transported from the first station 27 to the second station 28. The second gripper 69 is also involved in that pivotal movement; entraining the blank 25 in the second treatment station 28, the second gripper 69 is thus pivoted into a position in which that blank is disposed closely above the upper opening 72 of the lower conveyor shaft 30. In other words, the horizontal spacings in terms of arcuate movement between the respective treatment stations 27 and 28 on the one hand and between the treatment station 28 and the lower conveyor shaft 30 on the other hand correspond to each other. After they reach the respective limit positions, the gripper 68 and the gripper 69 are opened so that the blank 25 held by the gripper 68 is released in the treatment station 28 and the blank held by the gripper 69 is released above the lower conveyor shaft 30. With the components in those positions, at the same time the arm 58 is pivoted into its right-hand limit position, entraining the next blank to be found in the carrier 60. Thus, after the return movement in the opposite direction to the direction indicated by the arrow 70, into the initial position shown in FIGS. 9 and 10, the gripper 68 is in operative association with the next blank in the processing station 27 and the gripper 69 is in association with the next blank in the station 28. The operating procedure involved is generally such taht both grippers 68 and 69 are only closed after the treatment operations in the two stations 27 and 28 have been carried out on the blanks. For the respective blank to be treated in the station 27, it is possible for the apparatus to include an additional holder or carrier, for example in the form of a fork, which holds the blank during the operation of expanding it by means of the tool 64. That additional holder or carrier is not shown in the drawing, for the sake of enhanced clarity thereof.

The treatment operation on the blank in the station 28 is carried out at the same time as the treatment operation on the blank in the station 27. The station 28 includes tools 73 and 74 which can be moved up and down for the treatment operation on the blanks which involves expanding same with subsequent thermofixing thereof. There is no need for a detailed description of the tools 73 and 74 herein, as the nature and the mode of operation thereof will be apparent.

Reference will now be made to FIG. 11 showing a substantially radial longitudinal section through the structural unit B, closely beside one of the treatment stations 28. FIG. 11 shows the stationary housing 16 within which the drum 22 is arranged in coaxial relationship therewith. The housing 16 is provided in the region of each treatment unit with vertical slots 75, the number and the length in a vertical plane thereof depending on the number of individual tools to be actuated in the respective treatment unit. Associated with each of the tools is a respective cam 23 in the drum 22. The cams 23 are provided for guiding cam follower rollers 24 which are each connected to a holder for the respective tool by way of a spindle or shaft 76 which extends through one of the slots 75 in the housing 16. Thus, associated with each cam 23 are as many cam follower rollers 24 as the number of treatment means in a structural unit, which carry out the same treatment on the blanks and which are to be actuated by the cams. In other words, the number of cam follower rollers 24 per cam is normally the same as the number of treatment units at each structural unit A, B and C.

In the embodiment illustrated in FIG. 11, provided in the upper region of the treatment station 28 is a tool combination 73 which comprises two tools which can be actuated independently of each other, that is to say, which are displaceable vertically. Provided in the lower region of the station 28 is a tool combination 74 which has four individual tools which can be actuated independently of each other, that is to say, which are vertically displaceable. Accordingly, provided in the upper region of the station 28 are first and second tool holders 77a and 77b, each of which carries a respective tool 73a and 73b. Both tools 73a and 73b are of an annular configuration and are arranged coaxially with each other in such a way that the tool 73b which is of smaller diameter is disposed within the tool 73a.

The tool combination 74 comprises four tools which are also of a substantially annular configuration and which are arranged coaxially with respect to each other and which are carried by holders 78a, 78b, 78c and 78d. Each of the holders 77a, 77b and 78a through 78d respectively has associated therewith a cam follower roller 23 with a shaft or spindle 76 connecting same to the respective holder, so that, when the drum 22 rotates, the force required for moving the tools for carrying out the respective treatment operations on the blanks is transmitted to the respective tool by way of the respective cam 23 and the associated cam follower roller 24. The tool holders are guided on vertical guide bars 82 which are arranged in pairs and which are mounted to the housing 16.

FIG. 11 in particular shows that the configuration according to the invention makes it possible for a large number of tools in the treatment station 28 to be caused to operate on the blank 25 in a small space and possibly simultaneously with each other, without at the same time giving rise to the necessity for the cams 23 for actuating the individual tools and the holders thereof to be arranged at correspondingly small spacings from each other. In actual fact, because of the small vertical spacings between the tools which co-operate with the blank, that would be difficult to achieve, not to say even impossible, especially as the forces which are considerable at least in the case of some tools and which are to be transmitted from the cam follower roller to the respective tool would mean that the components for transmitting such forces would also have to be of corresponding dimensions. FIG. 11 in particular shows that the use of correspondingly long spacer members 80a and 80b which carry the individual tools 73a and 73b which directly act on the blank 25 means that the cams 23 can be arranged at spacings from each other on the drum 22, which do not correspond to the spacings of the tools 73a and 73b from each other or the association thereof with each other. That also applies in regard to the tools constituting the lower tool combination 74 and the cams 23 thereof. Accordingly that means that the sum of the stroke movements performed by all the tools in operation of the apparatus determines the height of the drum 23.

Reference will again be made to FIGS. 3 and 4 which show that the two stations 27 and 28 of each treatment unit may be positioned differently relative to the housing 16. The respective second stations 28 of all treatment units are directly connected to the housing at least in such a way that the guide bars 82 for the tools are fixed to the housing so that the latter also carries the reaction forces resulting from the forces which are applied to the respective second treatment stations 28 by the tools for carrying out the treatment operations on the blanks. The respective first stations 27 of all treatment units are displaced somewhat outwardly relative to the respectively associated second treatment stations 28 so that they are a greater radial distance from the longitudinal axis of the housing 16 than the respective second stations 28. In that connection the arrangement is such that all first stations 27 on the one hand and all second stations 28 on the other hand are arranged respectively on a common circle 88 and 87 respectively, in coaxial relationship with respect to the housing 16, and the circle 88 on which the first stations 27 are disposed is of larger diameter than the circle 87 on which the second stations 28 of all treatment units are disposed. The above-described arrangement makes it possible to provide a larger number of stations per structural unit A through C than when both stations of a respective treatment unit are arranged directly on the housing 16, that is to say for example on the circle 87 shown in FIG. 4. With the above-described arrangement, it is generally not possible for the treatment means in the first stations 27 to be actuated directly by the drum 22, that is to say by way of the cam follower rollers 24 and the shafts 76. That however does not involve any significant disadvantage as the first stations 27 are provided for carrying out treatment operations on the blanks, for example for varying the temperature thereof, that do not require major mechanical forces to be applied thereto. On the other hand, in situations in which it is desirable to provide that some operating means of the apparatus are actuated centrally, that is to say, with the actuating impetus being derived from the drum 22, it is possible to use bowden cable systems or other suitable transmission arrangements for deriving the movement of the blank-treatment means in the first stations 27 from the drum 22. If necessary, it is possible to provide special holders or supports which are independent of the housing 16, for the first stations 27, for example the tubular support members 85 which can be seen in FIGS. 3 and 9. Moreover, the above-described relative arrangement of the first and second stations 27 and 28 of a respective treatment unit also facilitates transportation of the blanks within the treatment unit from one station to another, as the transportation movement does not need to be along the periphery of the housing 16, thereby providing a higher degree of flexibility in regard to the transportation means and the transport paths to be followed.

The above-described configuration of the apparatus according to the present invention provides that the tools in the individual treatment units are actuated successively in the peripheral direction, in accordance with the peripheral speed of the drum 22, while the operating cycle in each station corresponds to a full revolution of the drum 22.

The blanks which come from the lower transport shaft 30 drop on to a stationary bottom member, the surface of which is disposed in the same plane as the surface of the lower disc 18. That stationary bottom member on to which the blanks fall may be an annular disc, similarly to the configuration and arrangement of the bottom member 53 which is associated with the upper disc 15, as described above for example with reference to FIGS. 7 and 8. From the stationary bottom member, after leaving the lower shaft 30, the blanks are pushed on to the lower disc 18 as described above with reference to FIG. 4, by means of an arm 87 which is pivotable with a reciprocating movement between a position beneath the lower shaft 30 and a position above the lower disc 18. From the disc 18, the blanks from all treatment units are passed on to a main discharge path 94, as indicated in FIG. 7, which leads to one of the conveyor devices 19 between the units A, B or C or which leads to a collecting container or the like when the structural unit in question is in fact the last unit C as illustrated in FIG. 1.

Referring still to FIGS. 3 and 4, the drive for the drum 22 is produced by means of a motor 89, by way of a gear 90 meshing with the internal teeth 91 on a flange 92 on the drum 22.

Figure 12:
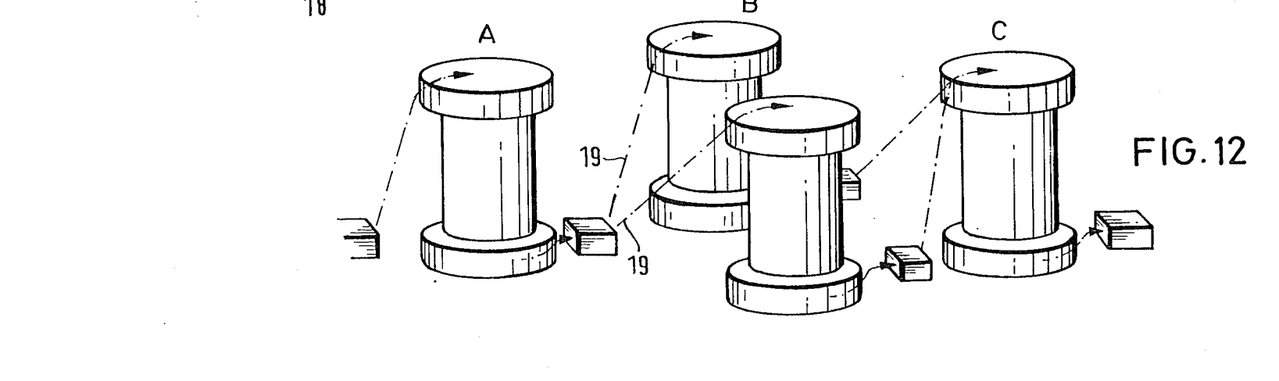
FIG. 12 is a view corresponding to that shown in FIG. 1 of another arrangement of the structural units.

Reference will now be made to FIG. 12 showing an overall arrangement of the apparatus in which two structural units B are combined with respective structural units A and C. Such a configuration of the apparatus takes account of the fact that for example the treatment time involved in the operating treatments to be carried out in the units B is markedly longer than the treatment time of the operations to be performed in the units A and C. An arrangement as illustrated in FIG. 12 assumes that the preformed blanks coming from the unit A are distributed by means of first and second conveyor paths 19 to respective ones of the two units B, while the blanks leaving the two units B must once again be brought together to provide a single delivery flow which is passed to the unit C.

It will be appreciated that the above-described apparatus structure and configurations have been set forth solely by way of example of the principles of the present invention and that various modifications and alterations may be made therein without thereby departing from the spirit and scope thereof.

What is claimed is:

1. Apparatus for producing hollow bodies of thermoplastic material by subjecting a hollow, substantially cylindrical blank having a bottom to an operating treatment on at least a portion of the blank, comprising at least one operating unit including: a vertical, substantially cylindrical housing; a plurality of treatment stations arranged at horizontal spacings at the periphery of said housing; in the upper region of said unit an annular disc rotatable about a vertical axis for supplying the blanks to be treated; in the lower region of said unit a second annular disc rotatable about the vertical axis for removing the treated blanks; and substantially vertical transport paths adapted to bridge the vertical spacings between the upper annular disc and a respective said treatment station and a said treatment station and the lower annular disc.

2. Apparatus as set forth in claim 1 wherein at least first and second said treatment stations in each operating unit for carrying out successive treatment operations on the blanks are combined together to form a treatment unit and wherein a plurality of said treatment units are arranged at horizontal spacings at the periphery of the housing, and further comprising, in each treatment unit, transport elements adapted to bridge the spacings between the treatment stations of a respective treatment unit.

3. Apparatus as set forth in claim 2 wherein the treatment stations of a treatment unit are arranged in substantially side-by-side relationship and the transport elements for transporting the blanks between the treatment stations of a respective treatment unit are provided with gripper means.

4. Apparatus as set forth in claim 2 wherein said transport elements for transportation of the blanks are adapted to perform a pivotal movement.

5. Apparatus as set forth in claim 2 wherein said transport elements are also adapted to provide for transportation of the blanks in relation to the substantially vertical transport path bridging the spacing between the upper annular disc and the first treatment station of the treatment unit.

6. Apparatus as set forth in claim 2 wherein said transport elements are also adapted to provide for transportation of the blanks in relation to the second treatment station of the treatment unit and the substantially vertical transport path bridging the spacing between the second treatment station and the lower annular disc.

7. Apparatus as set forth in claim 2 wherein the first treatment station of a treatment unit has means for bringing at least a portion of a blank to a temperature required for the treatment operation in the second treatment station.

8. Apparatus as set forth in claim 2 wherein the treatment stations of a treatment unit are arranged at different spacings from the longitudinal axis of the housing.

9. Apparatus as set forth in claim 2 wherein all treatment stations of an operating unit in which the same treatment operations are carried out on the blanks are arranged on a common circle and the respective circles defined by the stations providing the same treatment operation are of different diameters and are arranged in coaxial relationship with respect to the longitudinal axis of the housing.

10. Apparatus as set forth in claim 1 comprising movable means for treatment of said blanks and actuating means mounting said movable means on the housing movably substantially parallel to the longitudinal axis of the housing.

11. Apparatus as set forth in claim 10 wherein a respective treatment station has at least first and second treatment means and wherein at least some thereof are arranged in vertically superposed relationship.

12. Apparatus as set forth in claim 11 wherein in at least one of said treatment stations a drum is adapted exclusively to actuate treatment means in the second treatment station of each treatment station.

13. Apparatus as set forth in claim 12 and further comprising, at the end of each said branch path above the substantially vertical transport path associated therewith, a control member adapted to control the transfer of individual blanks from the branch path to the subsequent vertical transport path.

14. Apparatus as set forth in claim 13 wherein said control member is adapted to reciprocate in a substantially horizontal plane between first and second limit positions and wherein at its side co-operating with said blanks said control member has an edge recess of cross-sectional dimensions adapted to those of the blanks to be transported, and wherein in the one limit position of the control member said edge recess therein forms a continuation of said branch path and in the other limit position of said control member said edge recess therein is disposed above the vertical transport path substantially in a position of alignment therewith.

15. Apparatus as set forth in claim 13 wherein all said control members of a said treatment unit are adapted to be brought into and taken out of operation independently of each other.

16. Apparatus as set forth in claim 1 and further comprising within the stationary housing a drum rotatable about a vertical axis and having an outer peripheral surface, cam means on said outer peripheral surface of said drum, and cam follower means engaging with said cams and operatively associated with at least one of said treatment means in a respective said treatment station.

17. Apparatus as set forth in claim 1 wherein the horizontal region in which the upper annular disc rotates is divided into sectors of the same size and further comprising, in operative association with each said sector, a respective feed means for feeding blanks to the associated sector.

18. Apparatus as set forth in claim 1 comprising at least one horizontal blank-transport path delimited at its underside by said upper annular disc, and substantially horizontally extending branch paths which branch off said at least one horizontal transport path and which each have an end remote therefrom arranged above one of said substantially vertical transport paths, for bridging the spacing between said upper annular disc and the associated treatment station.

19. Apparatus as set forth in claim 18 and further comprising stationary guide elements for guiding the blanks, laterally delimiting said horizontal transport path above the annular disc.

20. Apparatus as set forth in claim 1 wherein at least the surface which carries the blanks of at least one of said first and second annular discs comprises glass.

21. Apparatus as set forth in claim 1 for producing hollow bodies of thermoplastic material by a procedure in which a respective blank is axially stretched at a temperature below the vitreous transition temperature of said material, comprising a first treatment station for bringing said blank to a temperature below the vitreous transition temperature and a second treatment station for subsequently stretching the blank, said first and second stations forming a respective treatment unit and a plurality of said treatment units being combined together to form said operating unit.

22. Apparatus as set forth in claim 1 for producing hollow bodies of thermoplastic material by a procedure in which a respective blank is subjected to a preliminary expansion at an open end thereof and, starting from said open end, is further expanded to a larger diameter and then subjected to thermo-fixing, comprising a first treatment station for pre-expanding said free end of said blank and a second treatment station for subsequently further expanding said blank to the final diameter thereof and thermo-fixing thereof, said first and second stations forming a respective treatment unit and a plurality of said treatment units being combined together to form a said operating unit.

23. Apparatus as set forth in claim 1 for producing hollow bodies of thermoplastic material by a procedure in which a respective blank is subjected to a reduction in diameter at its end region adjoining the opening thereof and a flange rim is formed at the reduced end region, comprising a first treatment station for reducing said end region of said blank and a second treatment station for subsequently producing said flange rim on the blank, said first and second stations forming a respective treatment unit and a plurality of said treatment units being combined together to form a said operating unit.

24. Apparatus as set forth in claim 1 and comprising a plurality of said operating units for carrying out successive treatment steps on the blank; and conveyor means interconnecting said units in consecutive arrangement.

25. Apparatus as set forth in claim 24 further comprising between at least some said units a working station for carrying out a respective intermediate treatment on said blanks.

26. Apparatus as set forth in claim 25 wherein said working station includes means for removing excess material from said blanks.

* * * * *